United States Patent [19]
Schmitt

[11] 3,744,019
[45] July 3, 1973

[54] SEISMIC COMPOSITION SYSTEM
[75] Inventor: Arthur Norman Schmitt, Houston, Tex.
[73] Assignee: Western Geophysical Company of America, Houston, Tex.
[22] Filed: Aug. 19, 1971
[21] Appl. No.: 173,271

Related U.S. Application Data
[63] Continuation of Ser. No. 795,596, Jan. 31, 1969, abandoned.

[52] U.S. Cl.................... 340/15.5 GC, 340/15.5 MC CP, 340/15.5 DP
[51] Int. Cl............................................. G01v 1/36
[58] Field of Search.............. 340/15.5 CP, 15.5 DP, 340/15.5 GC, 15.5 MC

[56] References Cited
UNITED STATES PATENTS
3,466,596  9/1969  Siems et al. ................. 340/15.5 DP
2,897,476  7/1959  Widess......................... 340/15.5 CP Primary Examiner—Benjamin A. Borchelt
Assistant Examiner—N. Moskowitz
Attorney—Michael P. Breston

[57] ABSTRACT

This invention relates to an improved method and apparatus for field compositing signals derived from a seismic exploration system. Consecutive records from seismic shots are suitably composited prior to being recorded, while portions of the records which exceed predetermined threshold levels become automatically conditioned during the compositing process thereby greatly improving the quality of the obtained seismic records.

6 Claims, 4 Drawing Figures

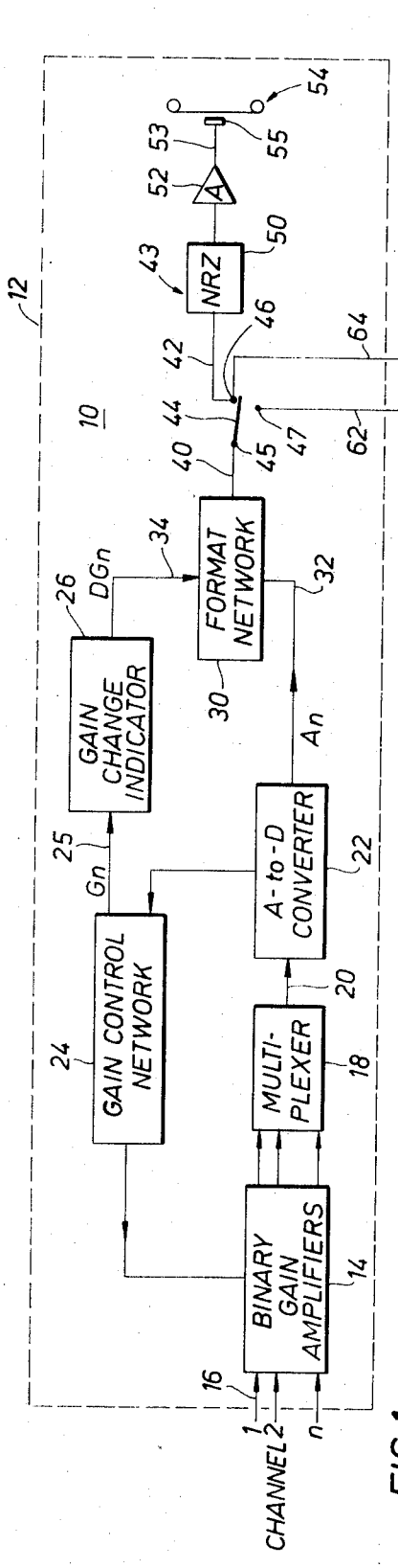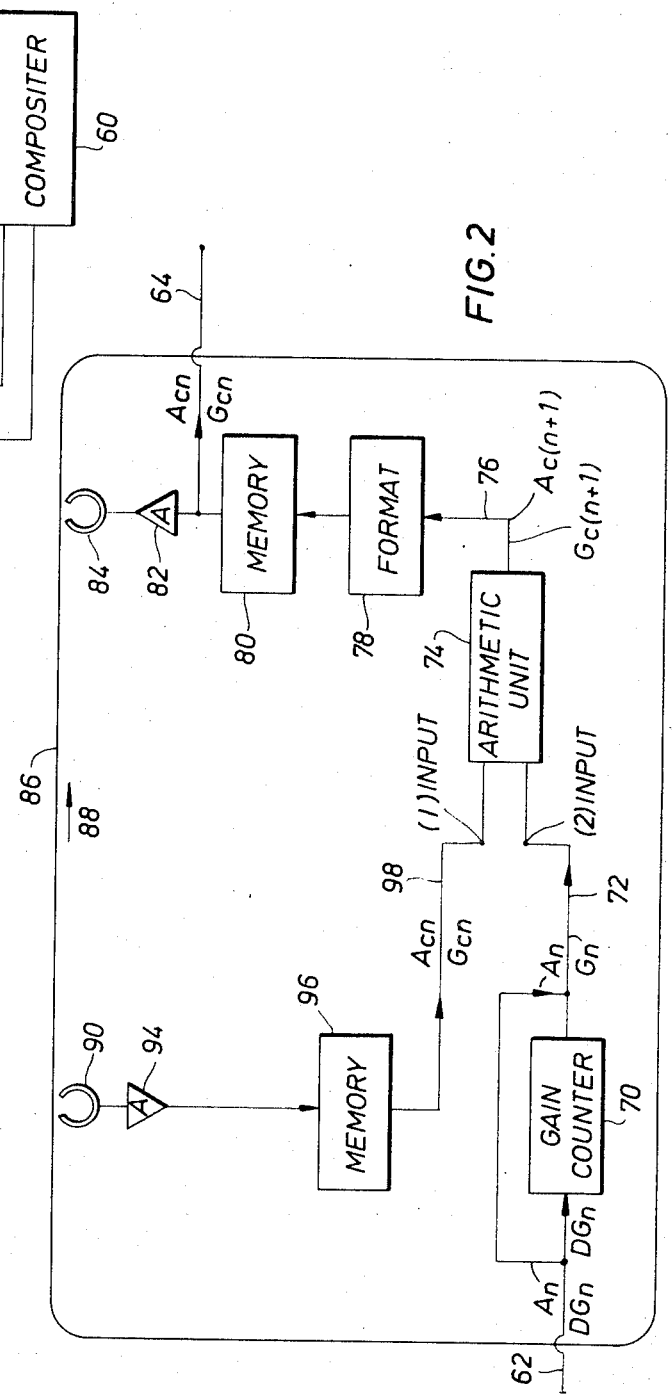

I. CONDITION    $G_{CN} > G_N > G_{TH}$

| Time | $T_{11}$ | | $T_{12}$ | |
|---|---|---|---|---|
| Input (2) | $A'_1$ | $G'_1$ | $A'_2$ | $G'_2$ |
| Input (1) | 0 | 0 | 0 | 0 |
| COMPOSITE | $A'_{C1} = A'_1$ | $G'_{C1} = G'_1$ | $A'_{C2} = A'_2$ | $G'_{C1} = G'_2$ |

II. CONDITION    $G_{CN} = G_N$

| Time | $T_{21}$ | | $T_{22}$ | |
|---|---|---|---|---|
| Input (2) | $A^2_1$ | $G^2_1$ | $A^2_2$ | $G^2_2$ |
| Input (1) | $A'_{C1}$ | $G'_{C1}$ | $A'_{C2}$ | $G'_{C2}$ |
| COMPOSITE | $A^2_{C1} = A^2_1 + A'_{C1}$ | $G^2_{C1} = G^2_1 = G'_{C1}$ | $A^2_{C2} = A^2_2 + A'_{C2}$ | $G^2_{C2} = G^2_2 = G'_{C2}$ |

III. CONDITION    $G_{CN} > G_N$

| Time | $T_{31}$ | |
|---|---|---|
| Input (2) | $A^3_1$ | $G^3_1$ |
| Input (1) | $A^2_{C1}$ | $G^2_{C1}$ |
| COMPOSITE | $A^3_{C1} = A^3_1 + A^2_{C1} \cdot 2^x$ | $G^3_{C1} = G^3_1$ |
| | where $x = G^3_1 - G^2_{C1}$ | |

IV. CONDITION    $G_{CN} < G_N$

| Time | $T_{41}$ | |
|---|---|---|
| Input (2) | $A^4_1$ | $G^4_1$ |
| Input (1) | $A^3_{C1}$ | $G^3_{C1}$ |
| COMPOSITE | $A^4_{C1} = A^3_{C1} + A^4_1 \cdot 2^x$ | $G^4_{C1} = G^3_{C1}$ |
| | where $x = G^3_{C1} - G^4_1$ | |

V. CONDITION    $G_N < G_{TH}$

| Time | $T_{51}$ | |
|---|---|---|
| Input (2) | $A^5_1$ | $G^5_1$ |
| Input (1) | $A^4_{C1}$ | $G^4_{C1}$ |
| COMPOSITE | $A^5_{C1} = A^4_{C1} \cdot 2^x$ | $G^5_{C1} = G_{TH}$ |
| | where $x = G_{TH} - G^4_{C1}$ | |

FIG. 3

SEISMIC COMPOSITION SYSTEM

This application is a continuation of Ser. No. 795,596, filed 1/31/69, now abandoned.

BACKGROUND OF THE INVENTION

In seismic exploration, seismic signals are generated by land or marine energy sources which include: gas exploders, vibrators, explosive charges, air guns, etc. Suitable transducers, geophones or hydrophones, usually arranged in arrays, convert the reflected seismic signals into corresponding electric signals. The transducers indescriminately respond to any waves. However, the seismic signals mostly of interest in a reflection seismic system are those which are reflected from different layers of the geological structure of interest. As is well known, the seismic signals of interest are very often obscured by interfering noise signals which may be stronger than the seismic signals. Various techniques have been devised and used for emphasizing the signals of interest and de-emphasizing noise. One such widely used technique for emphasizing the reflection signals is known in the art as compositing. The compositing technique may be used with both analogue and digital systems.

The digital seismic system now widely used is known as the "binary gain recording system". Such a multi-channel system is described, for example, in U.S. Pat. No. 3,315,223 issued on Apr. 18,1967 to HC. Hibbard, et al. This system can process a plurality of detected signals in digital form. It includes in each seismic channel a variable-gain amplifier, the gain of which is variable by fixed steps. Each step represents a change in gain of $2^x$.

The formats for recording the output digital signals from binary gain recording systems have now been standardized. In general, a binary gain recording system shifts automatically in both directions from a low-magnitude signal, high-gain range, to a high-magnitude signal, low-gain range, as the magnitude of the signal increases or decreases. The shifting of the gain of the amplifier in the system takes place between samplings of the signal. Each sample of an analog seismic signal from each variable-gain amplifier is represented in digital form by groups of binary digits or bits suitably formatted into words. Such words carry information about the sign and the magnitude of the sample signal at the output of the variable-gain amplifier, and about the gain or change of gain of the amplifier from an initial value at the time of the sample.

SUMMARY OF THE INVENTION

Broadly, the invention comprises a method of processing a plurality of seismic signals which allows correlative collected data to become composited and which suppresses non-correlative, extranuous signals. The method includes the steps of: selecting a threshold gain $G_{th}$-number; sequentially comparing all gain $G_1$, $G_2$ ... $G_n$-numbers of the S-words to be composited with their corresponding $G_{c1}$, $G_{c2}$ ... $G_{cn}$ numbers of the immediately preceding composited C-words; for each pair of $G_2$ and $G_{c1}$, $G_3$ and $G_{c2}$, ... $G_n$ and $G_{c(n-1)}$ numbers selecting the lowest valued gain number; normalizing the A-number corresponding to the non-selected gain number so that the selected and non-selected gain numbers become equal; and adding each pair of amplitude numbers to obtain a composite $A_c$-number. The method also includes the step of suppressing any A-number which has a G-number of a value less than said $G_{th}$-number.

In the system of this invention, the first record of S-words including $A_1$-and-$G_1$ numbers is written on an endless loop tape. Since prior to recording the first record the tape is clear, the first composite record is the first record. The second composite record is obtained by comparing the first composite record with the arriving second record, normalizing them to the lowest gain, adding the normalized records and recording the second composite record on the tape. The second composite record is read out and combined with the third arriving record to obtain the third composite record, etc. One word of each pair of words to be composited is suitably normalized to the lowest valued gain word. A threshold selector causes undesirable data to be attenuated or completely suppressed.

It is a broad object of this invention to provide a new method and apparatus for compositing and recording seismic data whereby signals which are likely to correspond to noise are suppressed and superior quality records are obtained.

Other objects and benefits of the invention are described in greater detail and are illustrated in the following drawings, in which:

FIG. 1 is a block diagram of typical binary gain recording system including the novel compositor of this invention;

FIG. 2 is a schematic representation of the endless loop tape recorder and associated networks used in the compositor shown in FIG. 1;

FIG. 3 shows the manner of normalizing and combining newly arriving data with prior composited data.

Figure 4:
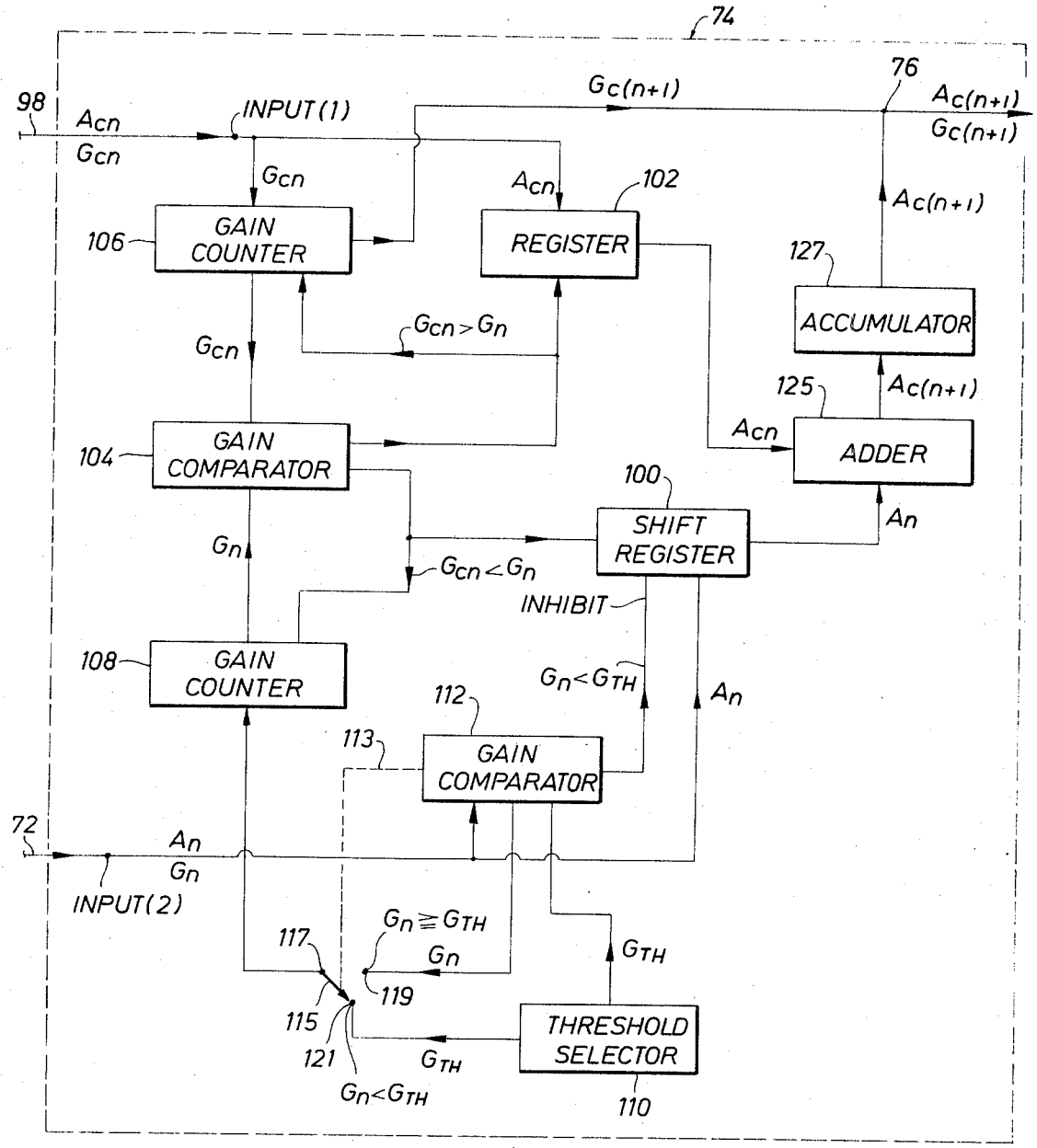
FIG. 4 is a more detailed block diagram of the arithmetic unit shown in FIG. 2.

Referring now more specifically to FIG. 1, a known seismic binary gain recording system generally designated as 10, is shown enclosed within dotted lines 12. Such a system can be purchased from several U.S. manufacturers. Since for an understanding of the method and system for compositing seismic data in accordance with the present invention it is helpful to have an understanding of the various networks within a typical binary gain recording system, such as system 10, a brief description thereof will now be given.

The binary gain recording system 10 typically includes a plurality of binary gain amplifiers 14 adapted to receive the incoming seismic signals from a plurality of channels (1,2 ... n) on lines 16. Binary gain amplifiers are described, for example, in said U.S. Pat. No. 3,315,223. The gain of each amplifier 14 is variable by fixed steps, wherein each step represents a change in gain of $2^x$. The output analog signals from amplifiers 14 are periodically sampled or multiplexed by a multiplexer 18. Each analog sample of the signal within each seismic channel is applied from multiplexer 18 through a line 20 to an analog-to-digital converter 22. Between converter 22 and the amplifiers 14 is connected a gain-control circuit 24 which shifts the gain of an appropriate amplifier 14 either up or down by said fixed steps in dependence upon the magnitude of the sample received by the converter 22. Thus the digital output of the converter 22 represents the amplitude (both magnitude and sign) of the analogue sample obtained by multiplexer 18 from an amplifier 14. In addition to controlling the gain of the binary amplifiers, the gain control network 24 also provides to line 25 a digital number indicative of the gain of amplifier 14 corresponding to the amplitude of the converted sample. The digital word representing a seismic sample is called herein an S-word which includes an A-number and a G-number. The A-number appears on output line 32 from converter 22 and the G-number appears on output line 25 from the gain-control network 24. Thus, in the binary gain recording system 10, analogue seismic samples are represented by S-words consisting of A-and-G-numbers expressed in binary form. To save on the quantity of digital tape required, it is now common practice to record not the G-numbers but the changes in the G-numbers, herein called DG-numbers, from an initial $G_o$-number. The DG-numbers are known as gain change indicators.

A gain change indicator network 26 receives the G-numbers from line 25 and converts them into DG-numbers which are applied to an input line 34 of a format network 30. The A-numbers are also applied by lines 32 to the format network 30 which suitably groups the A-and-DG-numbers together for proper recording.

In a system not employing my invention, the A-and-DG-numbers are applied by an output line 40 from format network 30 through a switch 44 to the input line 42 of a sub-assembly 43 known as "tape electronics". Sub-assembly 43 includes a non-return-to-zero (NRZ) network 50 and a write amplifier 52 which feeds an output line 53 connected to a recording head 55 of a digital tape recorder 54. The format used in recording the A-and-DG-numbers is fully described in copending Patent Application Ser. No. 593,781, now U.S. Pat. No. 3,436,723, assigned to the same assignee.

In accordance with the present invention the S-words of consecutive records within each seismic channel are composited in a novel manner by a compositer 60 prior to being recorded by recorder 54. The input signals to the compositer 60 are applied to its input line 62 from line 40 through a switch 44, having terminals 45, 46 and 47. The composited information is carried out by output line 64, terminal 46 of switch 44 and input line 42 of network 43, as previously described. The composited information thereafter becomes recorded on tape recorder 54.

Referring now to FIG. 2, a preferred embodiment of the compositer apparatus of the present invention includes a gain counter 70, which tallies the DG-numbers from the initial $G_o$ value in order to reconstruct for each A-number supplied to input line 62 its corresponding G-number. Of course, if to line 62 were already supplied the A-and-G-numbers, the gain counter 70 could be eliminated. The output A-and-G-numbers from the gain counter 70 are fed through line 72 into an "arithmetic unit" 74 which performs three primary functions: it compares the G-numbers of two incoming words and based on the results of this comparison the incoming A-numbers are suitably added or conditioned. The output of the arithmetic unit 74 on line 76 carries the composited words or C-words which are suitably arranged by a format network 78 and thence stored in a memory 80. The stored information from memory 80 is duly taken out and carried through an amplifier 82 to a write head 84 which records or stores temporarily the composited data on an endless-loop tape 86 moving in a clockwise direction as indicated by the arrow 88. The composited data recorded on tape 86 is read out by a read-out head 90 adjacently positioned to the write head 84, as shown. The read out information is amplified by an amplifier 94 and stored in a memory 96 from which it is taken out and fed through a line 98 to the arithmetic unit 74 in time to become compsited with a newly arriving record from the binary gain amplifier 14.

The operation of the compositer 60 will be described with reference in particular to one seismic channel, since the operation of the compositer in connection with the data of the remaining channels is identical. The function of the compositer 60 is to composite consecutive records corresponding to consecutive seismic shots and to supress from the compositing process those samples of the signal which have a relatively high value which means, in a binary gain amplifier system, that the sample has a low-valued G-number. The operation of the compositer 60 will be better understood with reference also to FIG. 3. Prior to the first seismic shot the tape 86 carries no information hence zeros are provided by input (1) on line 98 to the arithmetic unit 74. The first sample of the first record or $S_1^1$-word has an $A_1^1$-number and a $G_1^1$-number. The second sample of the first record has a $A_2^1$-number and a $G_2^1$-number, etc. In general $A_n^k$-number means the A-number of the $n^{th}$ sample of the $K^{th}$ record, similarly for $G_{cn}^k$ and $G_{cn}^k$, in the latter two cases the subscript "c" stands for composite. The expression $G_{th}$ means the threshold gain. For the conditions stated, the first record, since it has nothing added to it in the arithmetic unit 74, is recorded on the tape 86 as the first composite record. The first composite record is also supplied from memory 80 to output line 64 for recording on the digital tape recorder 54 of the binary gain recording system 10.

After recording the last sample of the first record on tape 86, the first sample of the first record is read out by head 90, stored in memory 96 from which it is timely applied to line 98 or input (1) of the arithmetic unit 74. At the same time, the first sample or $S_1^2$-word of the second record, having $A_1^2$-and-$G_1^2$-numbers, is also applied through the other input line 72, input (2), to the arithmetic unit 74. The gain comparator in the unit 74 compares the G-numbers of the first sample in the first and second records, and causes an adjustment in the G-number as shown in FIG. 3. The A-number corresponding to the changed G-number is also modified, conditioned or normalized. In sum, prior to compositing one S-word is normalized to the other S-word having a lower valued G-number. After the normalization step, the arithmetic unit 74 composites or adds the two A-numbers to obtain a composite $A_c$-number. The composite C-word is carried by output line 76, stored in memory 80 from which it is applied to the output line 64 of the compositer 60 and to the write head 84 for recording on tape 86. Then the second composite C-word of the first record is composited with the second S-word of the second record in an identical manner to obtain a second composite C-word for the second sample of the second record.

Then the third composite C-word of the first record is composited with the third S-word of the second record to obtain a third composite C-word for the second record to be recorded on tape 86 and supplied through output line 64 for recording on the recorder 54. The preceeding description of the operation is mathematically illustrated in FIG. 3.

As previously mentioned in accordance with an important aspect of the present invention some S-words have G-numbers which are less than a threshold $G_{th}$-number, then these G-numbers are made equal to the $G_{th}$-number and their corresponding A-numbers are suppressed.

Referring to FIG. 4, there is shown an arrangement of networks adapted to carry out the above-described functions in arithmetic unit 74. The $A_n$-and-$G_n$-numbers of the un-composited S-words arrive on line 72 into the input (2), while the composited C-words arrive on line 98 into input (1) of the arithmetic unit 74. The $A_n$ numbers are applied directly to an $A_n$ shift register 100 and the $A_{cn}$ numbers are applied to a shift register 102. Each shift register is capable of shifting data either to the left or to the right. The shifting of shift registers 100 and 102 is controlled by a gain comparator 104.

The $G_{cn}$ numbers are "loaded" into a gain counter 106 while the $G_n$ numbers are loaded into a counter 108. If $G_{cn}$ has a value less than $G_n$, the register 100 is shifted to the left. If $G_{cn}$ is greater than $G_n$, the register 102 is shifted to the left. Corresponding to each shift in register 102, the $G_{cn}$ numbers in counter 106 are decreased by one count (in one embodiment one count equals 6 db) until $G_{cn}$ equals to $G_n$. Similarly, corresponding to each shift in register 100, the $G_n$ numbers in counter 108 are decreased by one count until $G_n$ equals to $G_{cn}$.

A threshold selector 110 provides a threshold gain or $G_{th}$-number to the gain counter 108 in the event that the arriving $G_n$ number is less than the pre-determined threshold $G_{th}$ number. The comparison between the arriving $G_n$ numbers and the pre-determined threshold $G_{th}$ number is accomplished by a gain comparator 112 which controls, as indicated by the dotted line 113, a switch 115 having terminals 117, 119, and 121. When $G_n$ is greater than $G_{th}$ terminals 117 and 119 are inter-connected to allow the $G_n$ numbers to be loaded into the gain counter 108. When $G_n$ is less than $G_{th}$, terminals 117 and 121 are inter-connected to allow the $G_{th}$-number to be inserted into the gain counter 108.

In the event that the threshold $G_{th}$-number is inserted into the gain counter 108, the gain comparator 112 causes the shift register 100 to be inhibited, i.e., reset to zero. After the shifting of the data in either the shift register 100 or the shift register 102 is terminated, the data from both shift registers 100 and 102 is "loaded" into an adder 125 in which the $A_n$ and the $A_{cn}$ numbers are added to provide a new composited $A_{c(n+1)}$ number for storage into an accumulator 127. The outputs of accumulator 127 and of the gain counter 106 are supplied to the output line 76 of the arithmetic unit 74. For the subsequent transfer of the composited C-words from line 76, reference should be had to the description above provided in connection with FIG. 2.

It will be appreciated by those skilled in the art that each seismic record has significant time intervals which are listed in FIG. 3 as $T_{11}, T_{12}, \ldots T_{1n}$ indicating respectively the first sample of the first record, the second sample of the first record, etc. Similarly, $T_{21}$ indicates the first sample of the second record, etc. It will also be appreciated that suitable synchronizing and clock signals are respectively used throughout the binary gain recording system 10 to properly coordinate the operation of the various networks throughout the figures. Such synchronization signals have been deleted from the drawings for the sake of clarity.

The above and other advantages inherent in the method and system above described will become apparent to those skilled in the art. Even though the invention has been described with a great amount of detail, various modifications will become readily apparent to those skilled in the art and consequently the invention is best defined by the scope of the appended claims.

What I claim is:

1. In a method for digitally compositing seismic data derived from a plurality of seismic channels, each channel including an amplifier for amplifying the individual record data in each channel, the record data including both an indication of the amplitude of the record data at the output of said amplifier and of the gain of the amplifier corresponding to said amplitude indication, the steps of:

providing a plurality of recording channels on a first storage means;

periodically recording on said first storage means composited digital data including both an indication of the amplitude of the composited data and a gain indication;

periodically storing in a second storage means the output digital seismic record data from said channels including amplitude and gain data;

periodically and simultaneously reading out from said first storage means said recorded composited data and from said second storage means said seismic record data;

normalizing the readout record data or the composited data so that their respective gains are always equal to the lower gain value of either the composited data or the record data;

combining the normalized data with the other readout data to form new composited data; and recording the new composited data on said first storage means for compositing with new record data.

2. The method of claim 1 and;

comparing the respective gains of said recorded composited data and said seismic record data;

producing a shift-control signal from the comparison step;

storing the readout data in shift registers; and determining from the shift-control signal the direction and amount of shift in the registers to obtain the normalized record data.

3. In a system for digitally compositing seismic data derived from a plurality of seismic channels, each channel including an amplifier for amplifying the individual record data in each channel, the record data including both an indication of the amplitude of the record data at the output of said amplifier and of the gain of the amplifier corresponding to said amplitude indication, the system comprising:

a first storage means defining a plurality of recording channels for periodically recording composited data therein including both an indication of the amplitude of the composited data and a gain indication;

second storage means for periodically storing therein the output record data from said seismic channels including gain record data and amplitude record data;

readout means for periodically reading out from said first storage means said recorded composited data and from said second storage means said record data including gain record data;

normalizing means coupled to said readout means and adapted to normalize said readout data so that the gains of said record data and of said composited data always correspond to the lowest gain-valued data;

combining means coupled to said normalizing means for combining the normalized data with the other readout data to form new composited data; and means to store said new composited data on said first storage means for compositing with new seismic record data.

4. The system of claim 3 wherein, said normalizing means changes the amplitude of said seismic record data in dependence upon the difference between the gain of said seismic record data and the gain of said composited data.

5. The system as recited in claim 4 and further including;

means to compare the respective gains of said stored composited data and said stored seismic record data to produce a shift-control signal;

shift registers for storing said readout data; and said shift control signal determining the direction and amount of shift in one of said registers to obtain said normalized data.

6. The system of claim 3 wherein, said combining means includes an adder for adding said normalized data to said other readout data; and a memory for storing the output of said adder.

* * * * *